US012562316B2

(12) United States Patent
Eckstein et al.

(10) Patent No.: US 12,562,316 B2
(45) Date of Patent: Feb. 24, 2026

(54) DC LINK CAPACITOR WITH HEAT DISSIPATION

(71) Applicant: Schaeffler Technologies AG & Co. KG, Herzogenaurach (DE)

(72) Inventors: Daniel Eckstein, Achern (DE); Patrick Augustin, Bühl (DE); Nicolai Gramann, Renchen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 172 days.

(21) Appl. No.: 18/287,195

(22) PCT Filed: Apr. 14, 2022

(86) PCT No.: PCT/DE2022/100291
§ 371 (c)(1),
(2) Date: Oct. 17, 2023

(87) PCT Pub. No.: WO2022/228610
PCT Pub. Date: Nov. 3, 2022

(65) Prior Publication Data
US 2024/0206125 A1 Jun. 20, 2024

(30) Foreign Application Priority Data
Apr. 26, 2021 (DE) ..................... 10 2021 110 585.4

(51) Int. Cl.
*H01G 4/38* (2006.01)
*H01G 2/08* (2006.01)
*H01G 4/236* (2006.01)

(52) U.S. Cl.
CPC ................. *H01G 4/38* (2013.01); *H01G 2/08* (2013.01); *H01G 4/236* (2013.01)

(58) Field of Classification Search
None
See application file for complete search history.

(56) References Cited

U.S. PATENT DOCUMENTS

| | | | | | |
|---|---|---|---|---|---|
| 2,492,747 | A | * | 12/1949 | Herr | H01G 2/08 |
| | | | | | 174/15.1 |
| 4,309,739 | A | * | 1/1982 | Schmidt | H01G 2/08 |
| | | | | | 29/25.42 |

(Continued)

FOREIGN PATENT DOCUMENTS

| | | | |
|---|---|---|---|
| CN | 117174484 A | * | 12/2023 |
| DE | 112016000457 T5 | | 10/2017 |

(Continued)

OTHER PUBLICATIONS

Translation CN 117174484 A (no date).*

*Primary Examiner* — Eric W Thomas
(74) *Attorney, Agent, or Firm* — Volpe Koenig

(57) ABSTRACT

A DC link capacitor includes a lower busbar, an upper busbar, a cooling structure, and a plurality of structurally identical capacitor elements which are arranged between the lower busbar and the upper busbar and in electrical contact with the lower busbar and the upper busbar. The capacitor elements are spaced from each other in a longitudinal direction and in a transverse direction and are in thermally conductive contact with the cooling structure. The cooling structure includes thermally conductive element connected in a materially bonded manner to one of the lower busbar and the upper busbar. An active or passive cooling means is connected to an outer surface of one of the lower busbar and the upper busbar.

11 Claims, 9 Drawing Sheets

(56) References Cited

U.S. PATENT DOCUMENTS

| | | | | |
|---|---|---|---|---|
| 2010/0039748 A1 * | 2/2010 | Fujii | ..................... | H01G 4/224 |
| | | | | 361/274.1 |
| 2017/0133154 A1 | 5/2017 | Sasaki | | |
| 2018/0019062 A1 * | 1/2018 | Okuzuka | ............... | H01G 2/106 |

FOREIGN PATENT DOCUMENTS

| | | | |
|---|---|---|---|
| DE | 102019204200 A1 | 10/2020 | |
| DE | 102019213153 A1 | 3/2021 | |
| JP | 2001326131 A | * | 11/2001 |

* cited by examiner

DC LINK CAPACITOR WITH HEAT DISSIPATION

CROSS-REFERENCE TO RELATED APPLICATIONS

This application is the U.S. National Phase of PCT Appln. No. PCT/DE2022/100291 filed Apr. 14, 2022, which claims priority to DE 102021110585.4 filed Apr. 26, 2021, the entire disclosures of which are incorporated by reference herein.

TECHNICAL FIELD

The present disclosure relates to a DC link capacitor with heat dissipation. In particular, the present disclosure relates to a DC link capacitor with heat dissipation, comprising a lower busbar, an upper busbar, a cooling structure, and a plurality of structurally identical capacitor elements which are arranged between the lower busbar and the upper busbar for making electrical contact, wherein the capacitor elements are each arranged at a distance in a longitudinal direction and at a distance in a transverse direction and are in thermally conductive contact with the cooling structure.

BACKGROUND

DC link capacitors require a lot of installation space and have the lowest maximum temperature of all components in a drive inverter (traction inverter).

Wound film capacitors (for example, made of polypropylene film) with different film thicknesses depending on the operating voltage are known from the prior art. In drive inverters, film capacitors are adapted in a customized manner to the connected semiconductor modules and the respective installation space. The film windings are contacted via busbars with the semiconductor modules and the DC input via screwed or welded connections. Film windings and busbars are encapsulated in a plastic housing for protection against moisture and vibration.

DE 10 2019 213 153 A1 discloses a DC link capacitor for a power converter. The DC link capacitor has at least two metal busbars and at least one latent heat storage. The latent heat storage is arranged on the busbars in such a way that the latent heat storage and the busbars are in a thermally operative connection.

DE 10 2019 204 200 A1 discloses a capacitor, in particular a DC link capacitor for a multi-phase system, having a plurality of structurally identical capacitor elements. The capacitor elements are connected in parallel to one another and together form the DC link capacitor. At least one intermediate space is formed between the capacitor elements, which is at least partially filled by at least one thermally conductive element for dissipating heat from the DC link capacitor.

Due to the operation and high currents in traction inverters, waste heat is generated in the DC link capacitor. The resulting waste heat must be dissipated to ensure safe operation of the DC link capacitor within its respective specification. The better the heat dissipation, the smaller, lighter and less expensive the DC link capacitor can be built.

SUMMARY to the present disclosure provides a DC link capacitor with heat dissipation, wherein the size of the DC link capacitor is minimized and the heat dissipation is optimized.

One embodiment of the DC link capacitor with heat dissipation comprises a lower busbar, an upper busbar, a cooling structure, and a plurality of structurally identical capacitor elements. The plurality of structurally identical capacitor elements are arranged between the lower busbar and the upper busbar for making electrical contact. In this regard, the capacitor elements are each arranged at a distance from one another in a longitudinal direction and at a distance from one another in a transverse direction and are in thermally conductive contact with the cooling structure.

In one embodiment of the DC link capacitor, at least one thermally conductive element is provided, which defines the cooling structure and is connected in a materially bonded manner to the lower busbar or the upper busbar. An outer surface of the lower busbar or of the upper busbar may be connected to an active or passive cooling means. Due to the design incorporating the cooling structure and at least one thermally conductive element on the lower or upper busbar within the DC link capacitor, the thermal conduction to the cooling surface (usually on the underside, but without limiting the present disclosure thereto) is improved. In addition, the size of the DC link capacitor is minimized by the at least one thermally conductive element being connected in a materially bonded manner to the lower or upper busbar, i.e. the distance between the thermally conductive element and the corresponding busbar is further reduced.

In one embodiment of the DC link capacitor, the connection in a materially bonded manner of the at least one thermally conductive element of the cooling structure is a weld.

The cooling structure can comprise a plurality of thermally conductive elements, and several embodiments are conceivable therefor, as will be described below.

The plurality of thermally conductive elements can be arranged parallel to the longitudinal direction and parallel to the transverse direction and in each case bear against an outer surface of a respective capacitor element parallel to the longitudinal direction and parallel to the transverse direction of the capacitor elements.

In another embodiment, the plurality of thermally conductive elements are arranged parallel to the longitudinal direction and in each case bear against an outer surface of a respective capacitor element parallel to the longitudinal direction of the capacitor elements.

In another embodiment, the plurality of thermally conductive elements are arranged parallel to the transverse direction and in each case bear against an outer surface of a respective capacitor element parallel to the transverse direction of the capacitor elements.

In yet another embodiment, the plurality of thermally conductive elements are arranged parallel to the transverse direction and in each case bear against a respective plurality of adjacent capacitor elements on an outer surface of the capacitor elements parallel to the transverse direction.

In yet another embodiment, the plurality of thermally conductive elements are arranged parallel to the longitudinal direction and in each case bear against a respective plurality of adjacent capacitor elements on an outer surface of the capacitor elements parallel to the longitudinal direction.

The plurality of thermally conductive elements can be designed as cylinders arranged such that the plurality of cylinders in each case bear against a transition surface of each of the capacitor elements forming transition from the outer surface of each capacitor element parallel to the longitudinal direction and the outer surface of each capacitor element parallel to the transverse direction.

In one embodiment, the cooling structure is designed as integral and consists of a plurality of honeycombs. The integral cooling structure consisting of a plurality of honeycombs is connected in a materially bonded manner to the lower busbar or the upper busbar.

In another embodiment, the cooling structure consists of a plurality of honeycombs. Each of the honeycombs at least partially encloses a capacitor element each on its outer surface in the longitudinal direction, on its outer surface in the transverse direction and on its transition surface. A capacitor element is positioned in each honeycomb and the honeycomb together with the capacitor element is connected in a materially bonded manner to the lower busbar or the upper busbar at the respective predefined position.

BRIEF DESCRIPTION OF THE DRAWINGS

With reference to the accompanying drawings, the present disclosure and its advantages will now be explained in more detail by means of exemplary embodiments, without thereby limiting the present disclosure to the exemplary embodiments shown.

DETAILED DESCRIPTION

The drawings are merely schematic in nature and refer to exemplary embodiments to illustrate the present disclosure. The proportions in the figures do not always correspond to the real proportions, since some shapes are simplified and other shapes are shown enlarged in relation to other elements for better illustration. Consequently, the drawings are not to be construed as limiting the present disclosure to the exemplary embodiments shown.

Figure 1:
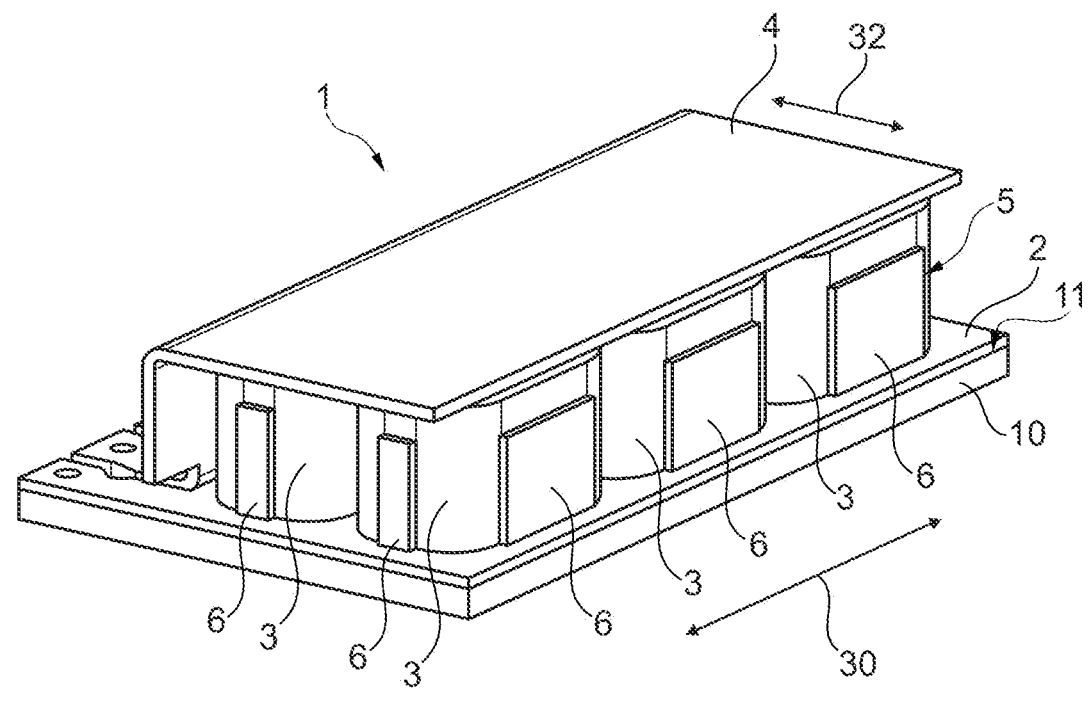
FIG. 1 shows a perspective view of a DC link capacitor according to the present disclosure which has not yet been encapsulated with potting compound.
Figure 2:
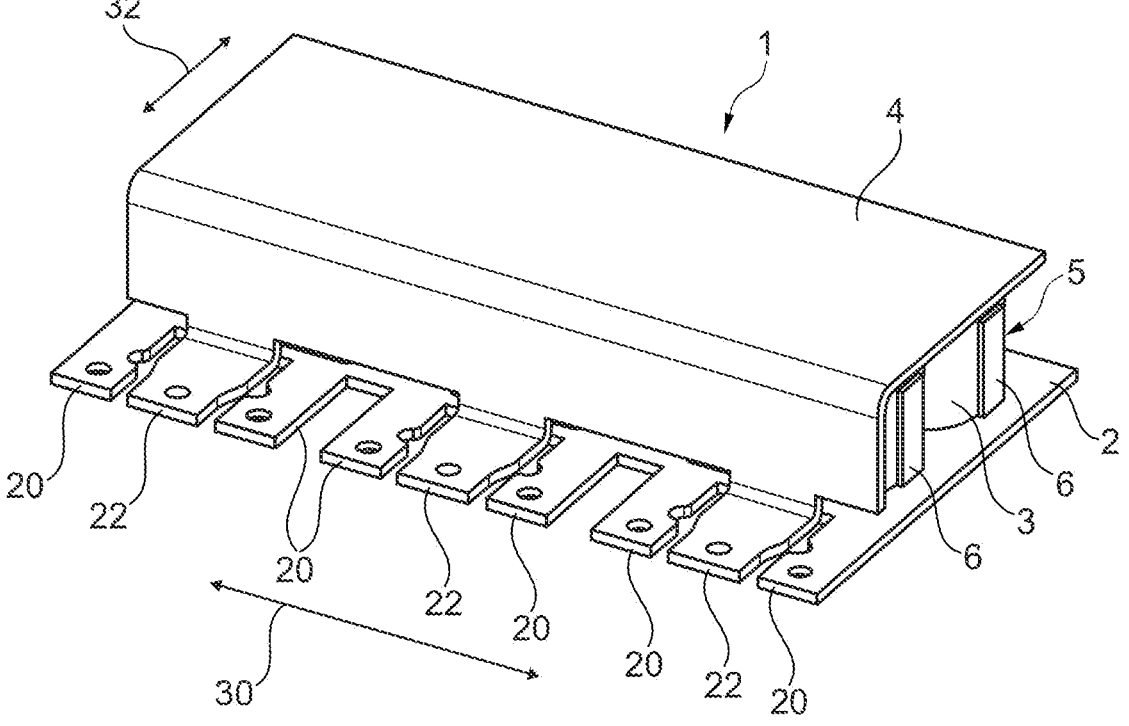
FIG. 2 shows another perspective view of the embodiment of the DC link capacitor from FIG. 1.

FIG. 1 shows a perspective view of an embodiment of a DC link capacitor 1 with heat dissipation according to the present disclosure. FIG. 2 shows a perspective view of the embodiment of the DC link capacitor from FIG. 1 from a different perspective. In both illustrations, the DC link capacitor 1 has not yet been potted with potting compound. The DC link capacitor 1 comprises a lower busbar 2, an upper busbar 4, a cooling structure 5, and a plurality of structurally identical capacitor elements 3. The plurality of structurally identical capacitor elements 3 are arranged between the lower busbar 2 and the upper busbar 4 for making electrical contact with the busbars 2, 4. For example, the lower busbar 2 forms a positive terminal with at least one first connection element 20. For example, the upper busbar 4 forms a negative terminal with at least one second connection element 22. Similarly, the lower busbar 2 can be a negative terminal and the upper busbar 4 can be a positive terminal.

The capacitor elements 3 are each arranged at a distance 31 (see, for example, FIGS. 3-4) in a longitudinal direction 30 and at a distance 33 (see, for example, FIG. 3-4) in a transverse direction 32 and are in thermally conductive contact with the cooling structure 5.

At least one thermally conductive element 6 defines the cooling structure 5 and is connected in a materially bonded manner to the lower busbar 2 or the upper busbar 4. The connection in a materially bonded manner of the at least one thermally conductive element 6 of the cooling structure 5 is, for example, a weld, in particular a laser weld, without limiting the present disclosure thereto.

An outer surface 11 of the lower busbar 2 or of the upper busbar 4 is connected to an active or passive cooling means 10. In the embodiment shown here, the underside of the lower busbar 2 has the outer surface 11, which is connected to the active or passive cooling means 10 (see, for example, FIG. 1).

In general, the cooling structure 5 can comprise a plurality of thermally conductive elements 6, as also shown in FIGS. 1 and 2, without limiting the present disclosure thereto. Several embodiments are conceivable for the arrangement of the plurality of thermally conductive elements 6 of the cooling structure 5, as described below with respect to FIGS. 3 to 26.

Figure 3:
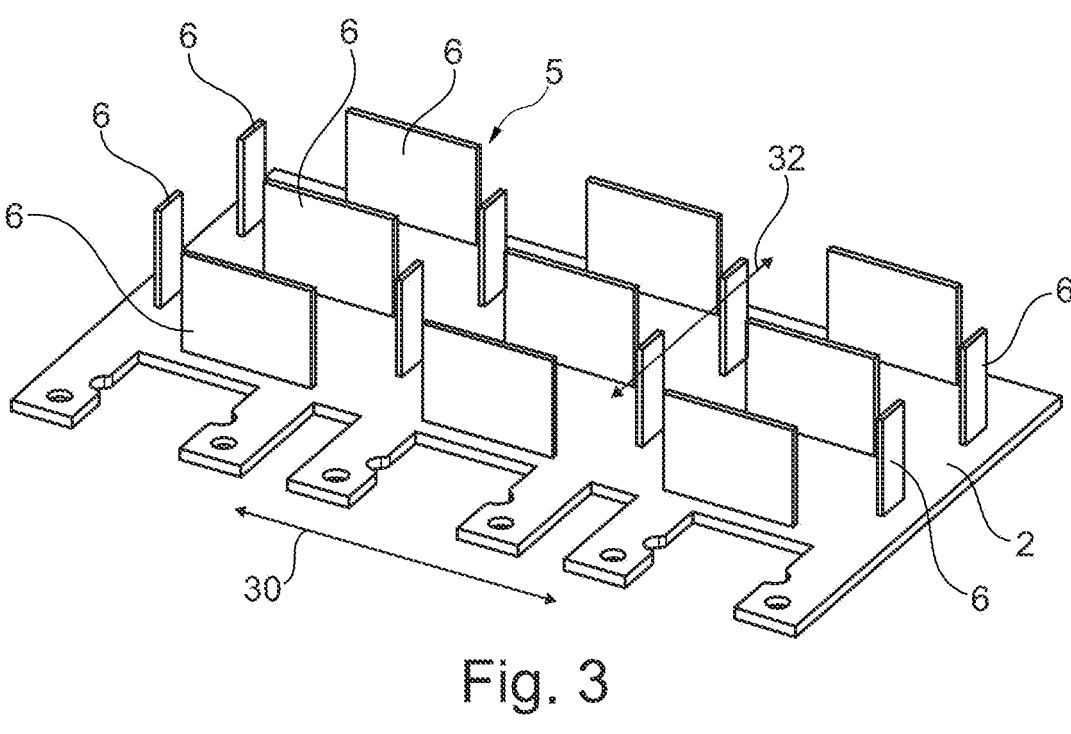
FIG. 3 shows a perspective view of an embodiment of the arrangement of thermally conductive elements of the cooling structure.
Figure 4:
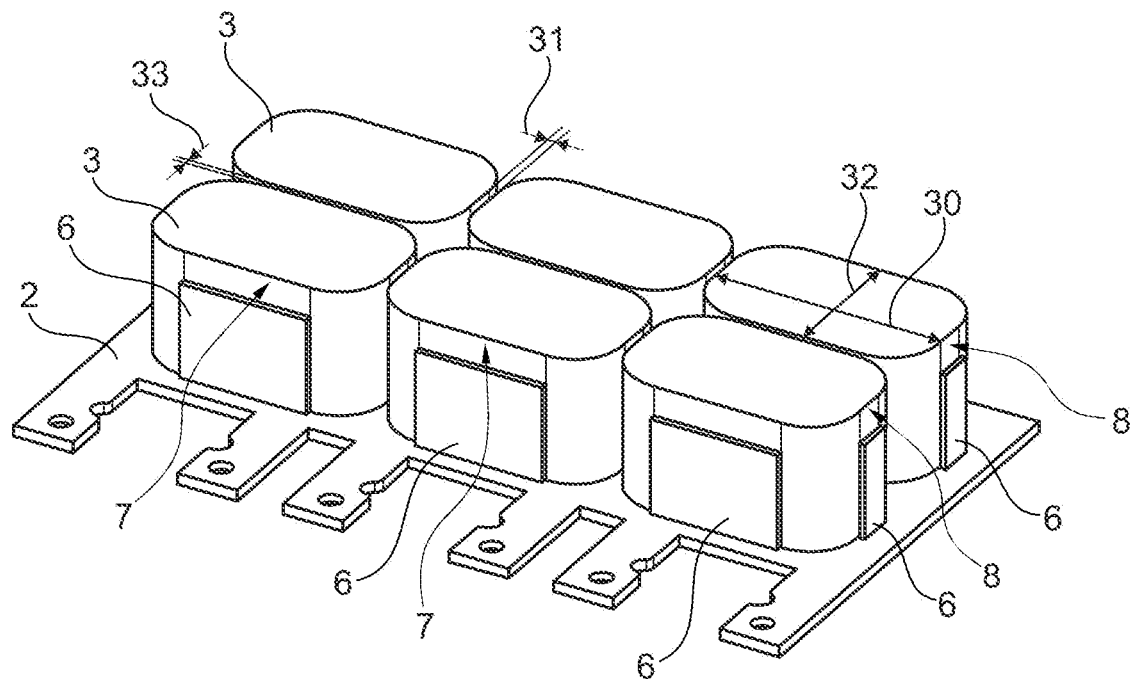
FIG. 4 shows a perspective view of the spatial assignment of the capacitor elements in relation to the embodiment of the cooling structure in FIG. 3.

FIG. 3 shows a perspective view of a possible embodiment of the arrangement of thermally conductive elements 6 of the cooling structure 5. FIG. 4 shows a perspective view of the spatial assignment of the capacitor elements 3 in relation to the embodiment of the cooling structure 5 in FIG. 3. The capacitor elements 3 are each arranged at a distance 31 from one another in a longitudinal direction 30 and at a distance 33 from one another in a transverse direction 32 and are in thermally conductive contact with the cooling structure 5.

The plurality of thermally conductive elements 6 are designed here as cooling fins or cooling plates or cooling sheets. The thermally conductive elements 6 that bear against an outer surface 7 (see FIG. 4) of the respective capacitor elements 3 in the longitudinal direction 30 have, for example, a larger area than the thermally conductive elements 6, as shown here, that bear against an outer surface 8 of the respective capacitor element 3 in the transverse direction 32. This embodiment of the present disclosure described herein is not intended to be construed as limiting the present disclosure. The plurality of thermally conductive elements 6 are arranged parallel to the longitudinal direction 30 and parallel to the transverse direction 32. In particular, in this embodiment, some of the thermally conductive elements 6 are arranged parallel to the longitudinal direction 30 and others are arranged parallel to the transverse direction 32. The plurality of thermally conductive elements 6 in each case bear against the outer surface 7 or 8 of one respective capacitor element 3. In particular, the thermally conductive elements 6 bear against the respective outer surface 7 of one respective capacitor element 3 parallel to the longitudinal direction 30 of the capacitor elements 3, and the other thermally conductive elements 6 bear against the respective outer surface 8 of one respective capacitor element 3 parallel to the transverse direction 32 of the capacitor elements 3.

Figures 5, 6, 7:
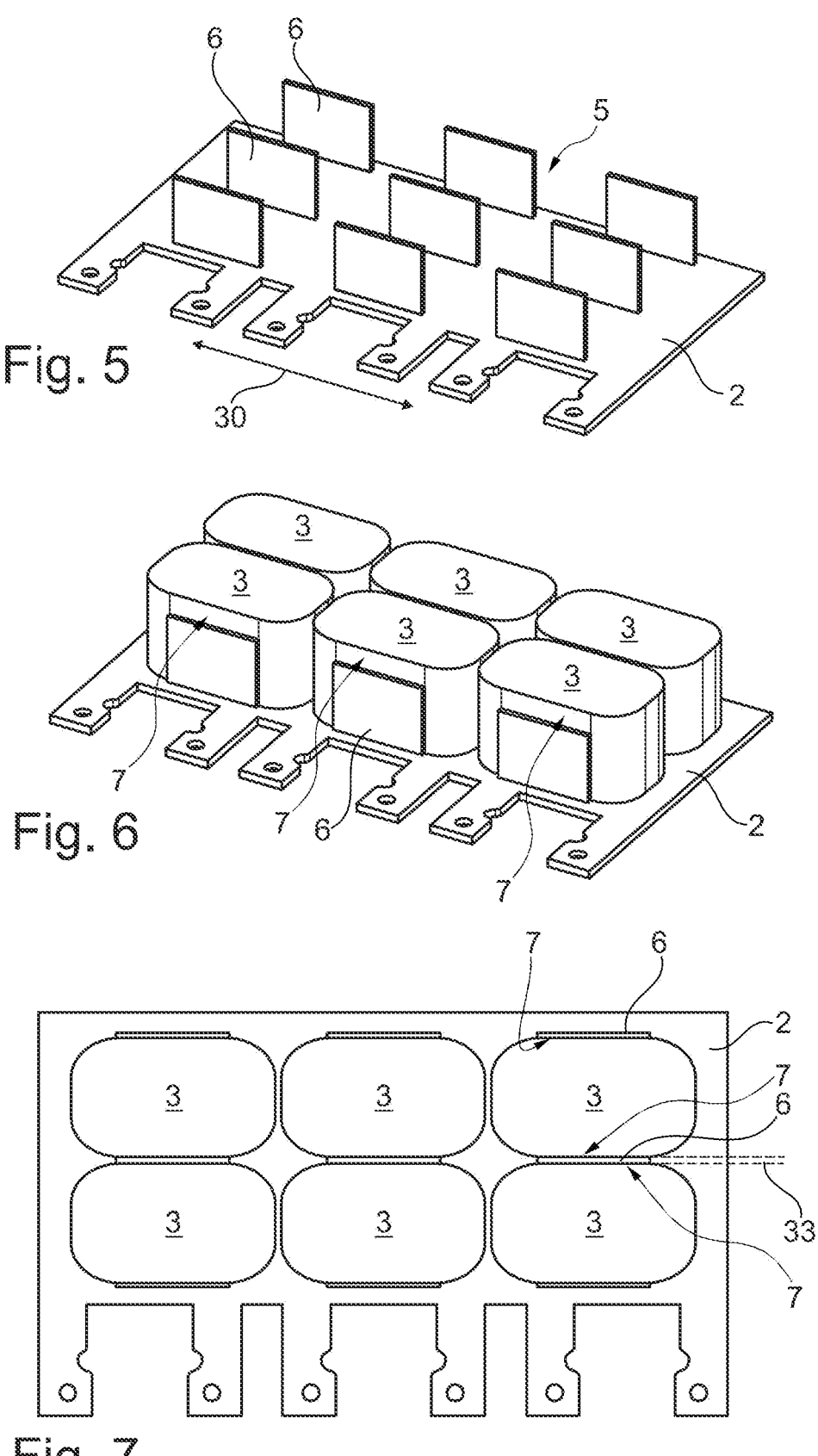
FIGS. 5 to 7 show another embodiment of the arrangement of thermally conductive elements of the cooling structure and the capacitor elements.

FIGS. 5 to 7 show another embodiment of the arrangement of thermally conductive elements 6 of the cooling structure 5 and the capacitor elements 3. FIG. 5 shows a perspective view of this embodiment of the arrangement of thermally conductive elements 6 of the cooling structure 5. FIG. 6 shows a perspective view of the spatial assignment of the capacitor elements 3 in relation to the embodiment of the cooling structure 5 in FIG. 5. FIG. 7 shows a top view of the cooling structure 5 and capacitor elements 3 from FIG. 6. The plurality of thermally conductive elements 6 of the cooling structure 5 are all arranged parallel to the longitudinal direction 30 and in each case bear against the outer surface 7 of a respective capacitor element 3 parallel to the longitudinal direction 30 of the capacitor elements 3.

Figures 8, 9, 10:
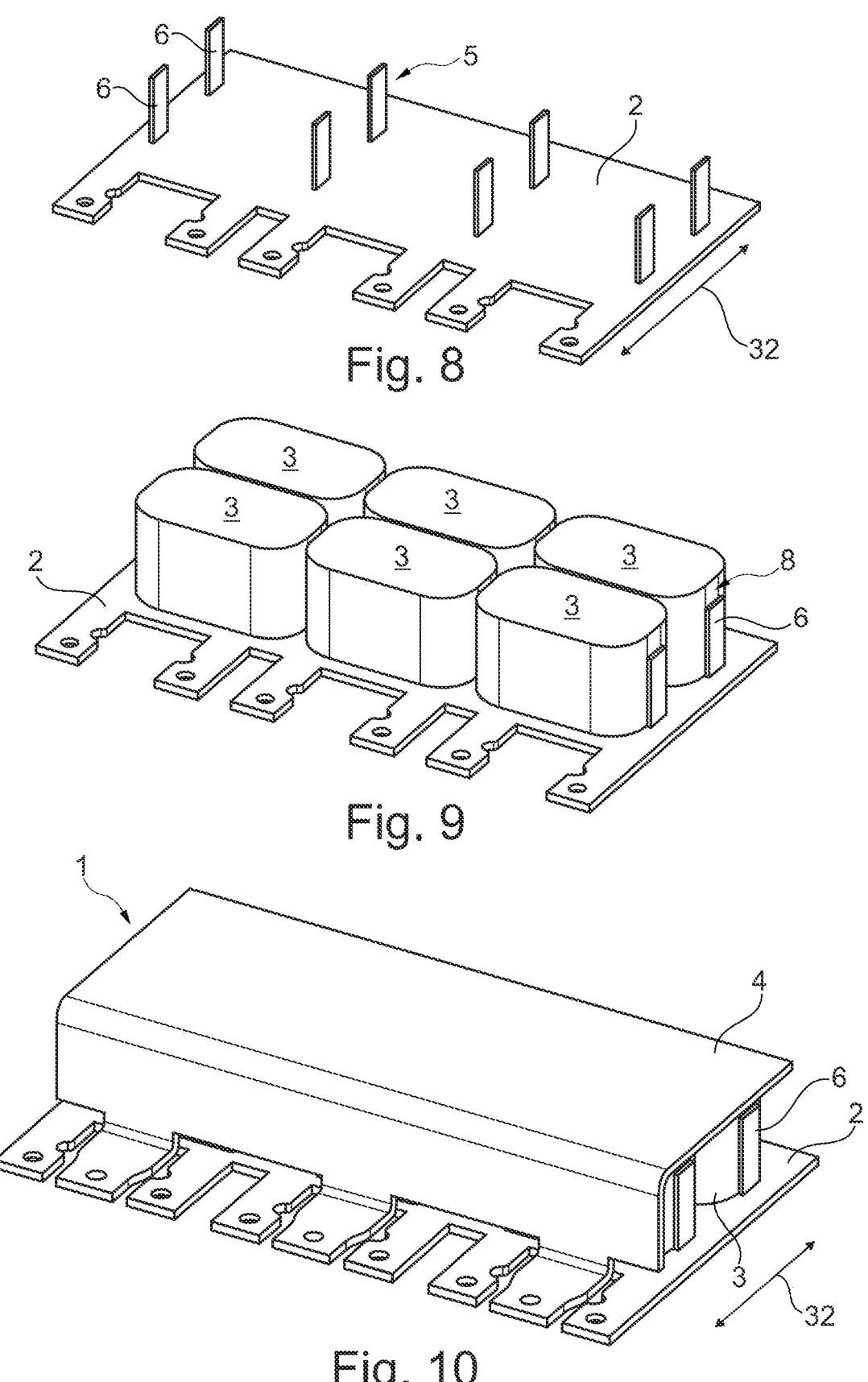
FIGS. 8 to 10 show another embodiment of the arrangement of thermally conductive elements of the cooling structure and the capacitor elements.

FIGS. 8 to 10 show another embodiment of the arrangement of thermally conductive elements 6 of the cooling structure 5 and the capacitor elements 3. FIG. 8 shows a perspective view of this embodiment of the arrangement of thermally conductive elements 6 of the cooling structure 5. FIG. 9 shows a perspective view of the spatial assignment of the capacitor elements 3 in relation to the embodiment of the cooling structure 5 in FIG. 8. FIG. 10 shows a perspective view of the DC link capacitor 1, again not yet potted, with the cooling structure 5 from FIG. 9 and the upper busbar 4 above the arrangement of the capacitor elements 3 and the thermally conductive elements 6 of the cooling structure 5 on the lower busbar 2 from FIG. 9. The plurality of thermally conductive elements 6 of the cooling structure 5 are all arranged parallel to the transverse direction 32 and in each case bear against the outer surface 8 of one respective capacitor element 3 parallel to the transverse direction 32 of the capacitor elements 3.

Figures 11, 12, 13:
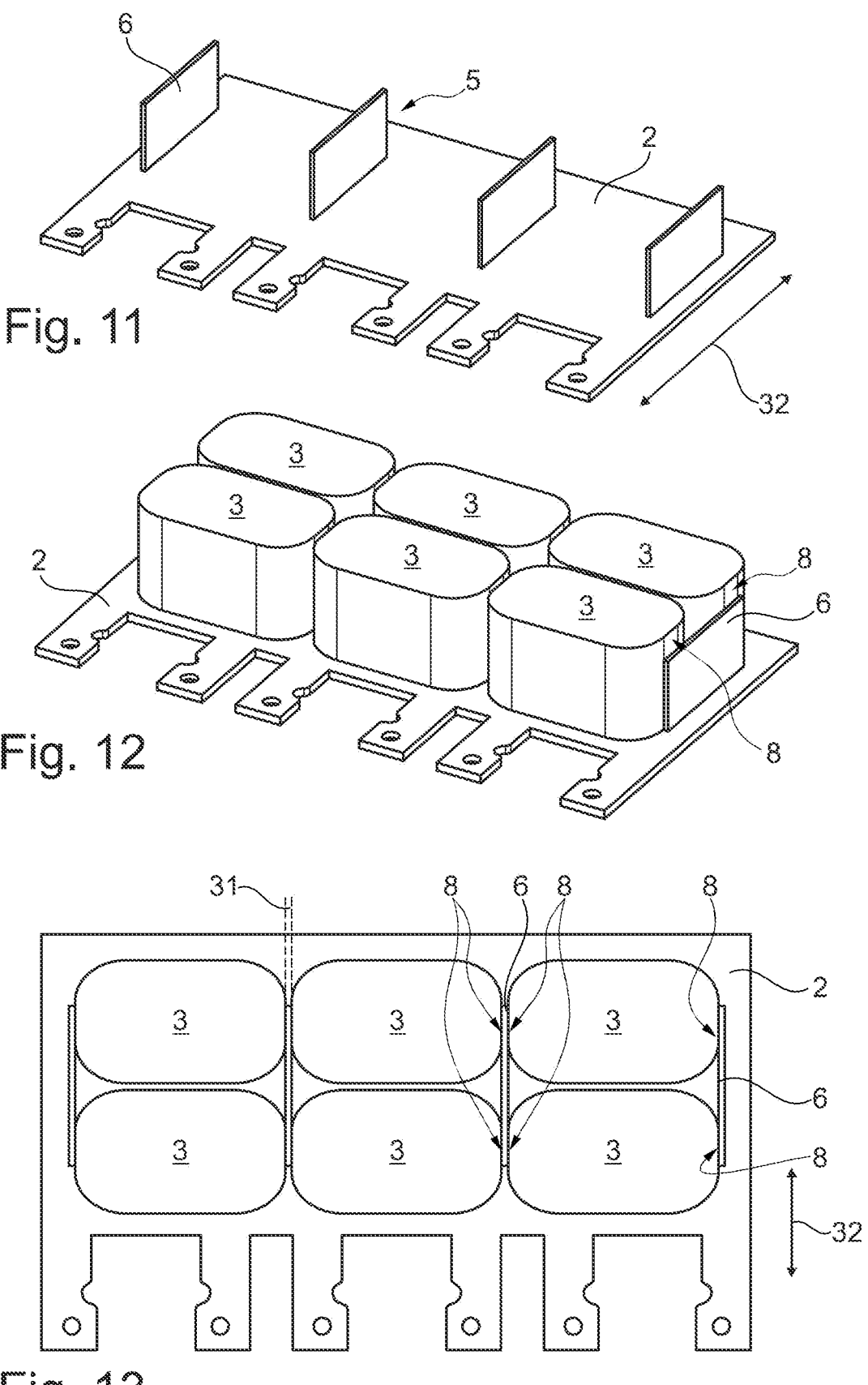
FIGS. 11 to 13 show yet another embodiment of the arrangement of thermally conductive elements of the cooling structure and the capacitor elements.

FIGS. 11 to 13 show yet another embodiment of the arrangement of thermally conductive elements 6 of the cooling structure 5 and the capacitor elements 3. FIG. 11 shows a perspective view of this embodiment of the arrangement of thermally conductive elements 6 of the cooling structure 5. FIG. 12 shows a perspective view of the spatial assignment of the capacitor elements 3 in relation to the embodiment of the cooling structure 5 in FIG. 11. FIG. 13 shows a top view of the cooling structure 5 and capacitor elements 3 from FIG. 12. The plurality of thermally conductive elements 6 of the cooling structure 5 are arranged parallel to the transverse direction 32 and in each case bear against a respective plurality of adjacent capacitor elements 3 on the outer surface 8 of the capacitor elements 3 parallel to the transverse direction 32. In the case shown, one thermally conductive element 6 each bears against the outer surfaces 8 of two capacitor elements 3. As can be seen from the embodiment shown here, a single thermally conductive element 6 can bear against the outer surfaces 8 of four adjacent capacitor elements 3 of the DC link capacitor 1. The number of capacitor elements 3 of this embodiment shown here and mentioned in the description is not intended to be construed as limiting the present disclosure.

Figures 14, 15, 16:
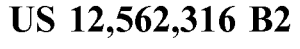
FIGS. 14 to 16 show yet another embodiment of the arrangement of thermally conductive elements of the cooling structure and the capacitor elements.

FIGS. 14 to 16 additionally show yet another embodiment of the arrangement of thermally conductive elements 6 of the cooling structure 5 and the capacitor elements 3. FIG. 14 shows a perspective view of this embodiment of the arrangement of thermally conductive elements 6 of the cooling structure 5. FIG. 15 shows a perspective view of the spatial assignment of the capacitor elements 3 in relation to the embodiment of the cooling structure 5 in FIG. 14. FIG. 16 shows a top view of the cooling structure 5 and capacitor elements 3 from FIG. 15. The plurality of thermally conductive elements 6 are arranged parallel to the longitudinal direction 30 and in each case bear against a plurality of adjacent capacitor elements 3 on the outer surface 7 of the capacitor elements 3 parallel to the longitudinal direction 30. In the case shown, one thermally conductive element 6 each bears against the outer surfaces 7 parallel to the longitudinal direction 30 of the six (inner) or three (outer) respectively adjacent capacitor elements 3 of the DC link capacitor 1. The number of capacitor elements 3 of this embodiment shown here and mentioned in the description is not intended to be construed as limiting the present disclosure.

In the illustrations according to FIGS. 1 to 16, the thermally conductive elements 6 are, for example, without limiting the present disclosure thereto, connected to the respective busbar 2 or 4 as simple copper sheets, for example via laser welding technology.

Figures 17, 18, 19:
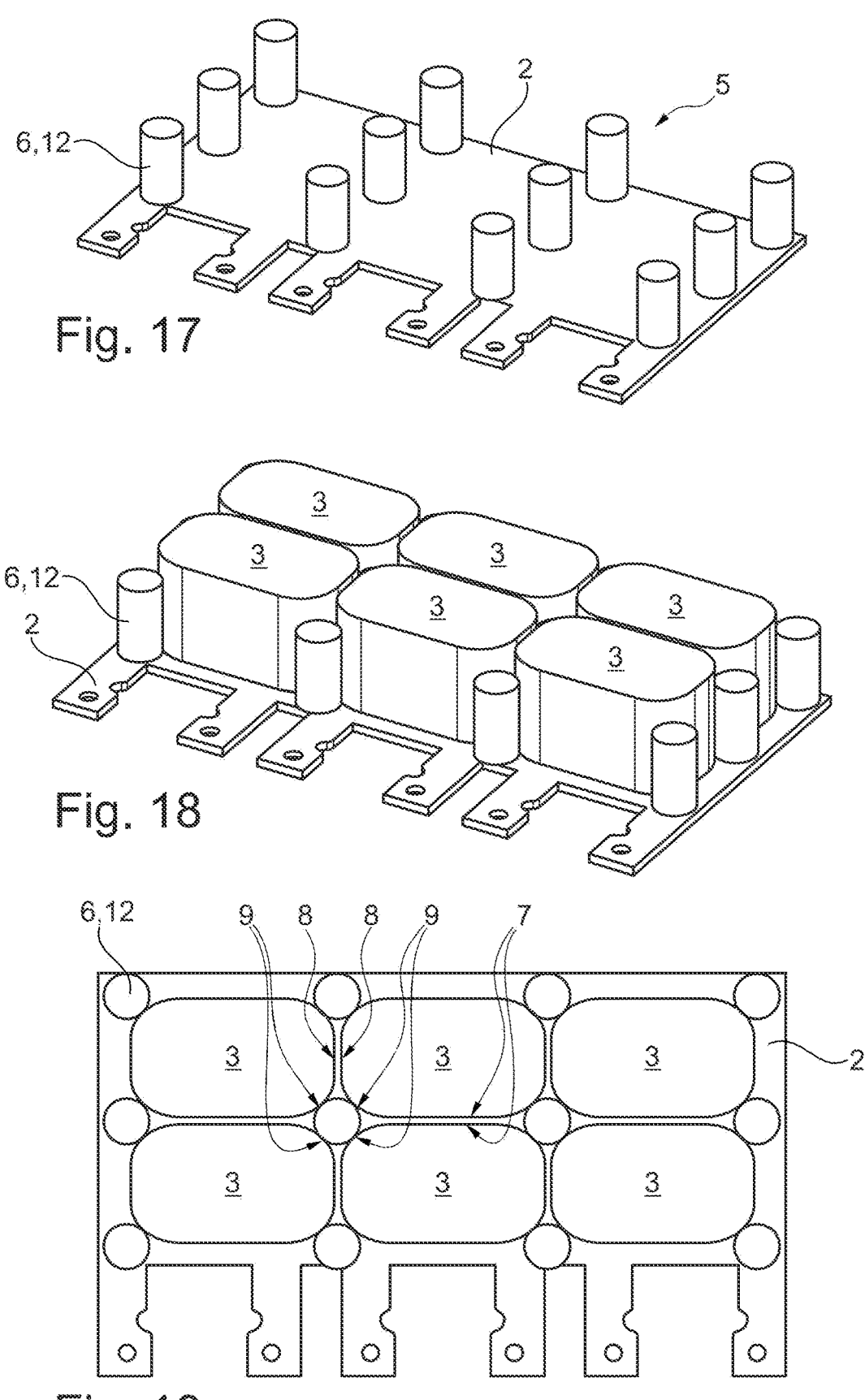
FIGS. 17 to 19 show an embodiment of cylinders as thermally conductive elements of the cooling structure and their spatial assignment to the individual capacitor elements.

FIGS. 17 to 19 show an embodiment of the thermally conductive elements 6, designed in the form of a cylinder 12 each, of the cooling structure 5 and their spatial assignment to the individual capacitor elements 3. FIG. 17 shows a perspective view of this embodiment of the arrangement of thermally conductive elements 6 in the form of cylinders 12 of the cooling structure 5. FIG. 18 shows a perspective view of the spatial assignment of the capacitor elements 3 in relation to the embodiment of the cooling structure 5 in FIG. 17. FIG. 19 shows a top view of the cooling structure 5 and capacitor elements 3 from FIG. 18. The plurality of thermally conductive elements 6 of the cooling structure 5 are designed as cylinders 12. The cylinders 12 are arranged such that they in each case bear against a transition surface 9 of each of the capacitor elements 3, wherein the transition surfaces 9 respectively form a transition from the outer surface 7 of each capacitor element 3 parallel to the longitudinal direction 30 to the outer surface 8 of each capacitor element 3 parallel to the transverse direction 32. In the illustrated embodiment of the capacitor element 3, the transition surfaces 9 are, for example, the rounded corner surfaces of the capacitor elements 3. In this embodiment, a single cylinder 12 contacts one each of the four (inner) or two (at the edge) or one (at the corner) transition surface(s) 9 of one of the capacitor elements 3 each of the DC link capacitor 1. Thus, four or two or one cylinder(s) 12, respectively, always bear(s) against each of the capacitor elements 3 at their respective transition surfaces 9. The embodiment with cylinders 12 is also conceivable with other numbers of capacitor elements 3 and cylinders 12, and the previous description is not to be construed as limiting the present disclosure.

In the embodiments according to FIGS. 17 to 19, the cylinders 12 are made, for example, without limiting the present disclosure thereto, of copper sheet or of solid copper and are connected to the respective busbar 2 or 4, for example via laser welding technology.

Figures 20, 21, 22:
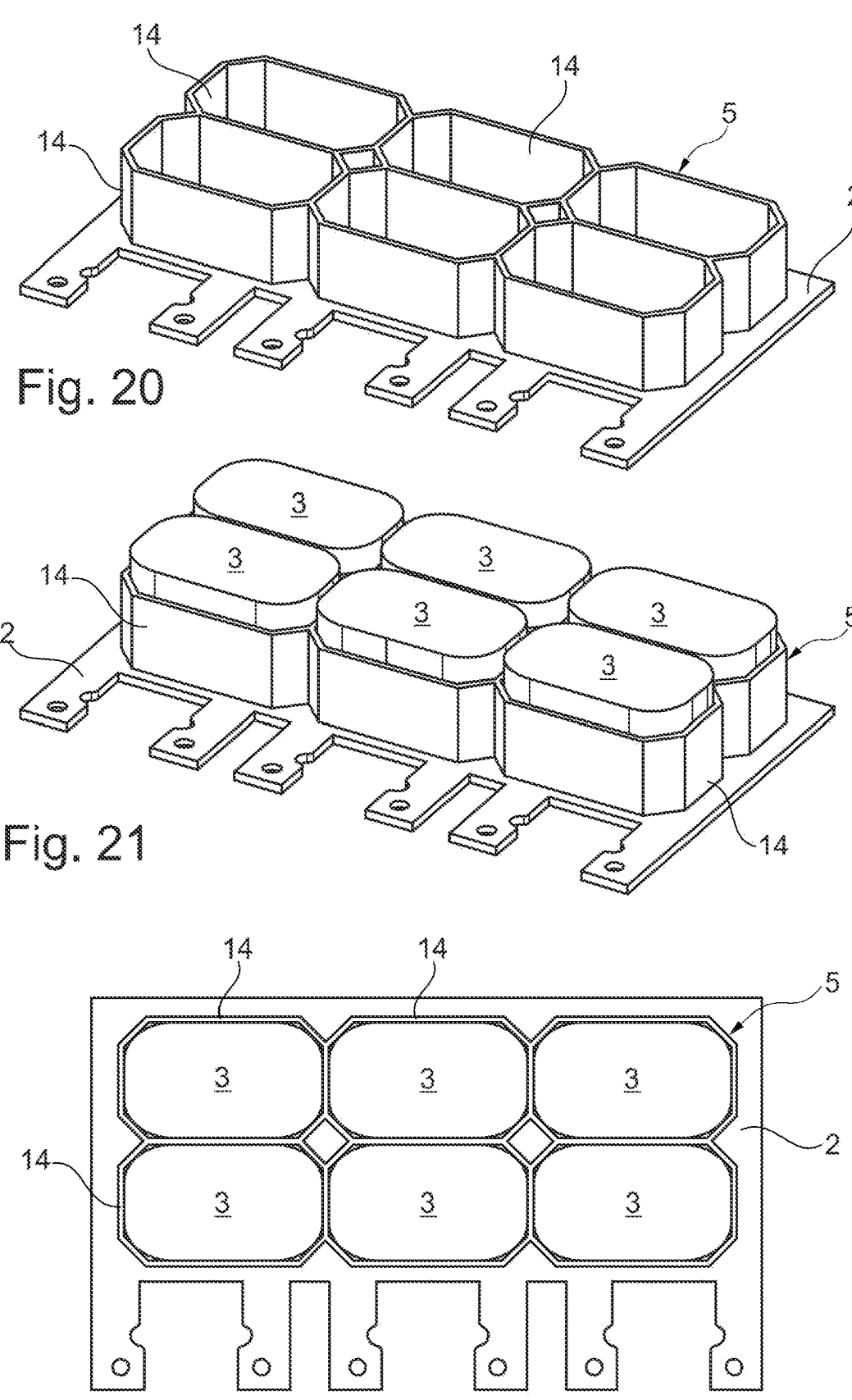
FIGS. 20 to 22 show an integral embodiment of the cooling structure and the assignment of the capacitor elements to the cooling structure.

FIGS. 20 to 22 show an integral embodiment of the cooling structure 5 and the assignment of the capacitor elements 3 to the cooling structure 5. FIG. 20 shows a perspective view of this embodiment of the integral cooling structure 5 with honeycombs 14 as thermally conductive elements. FIG. 21 shows a perspective view of the spatial assignment of the capacitor elements 3 in relation to the embodiment of the cooling structure 5 in FIG. 20. FIG. 22 shows a top view of the cooling structure 5 and capacitor elements 3 from FIG. 21. The cooling structure 5 is designed as integral and comprises a plurality of honeycombs 14, in this example six honeycombs 14, without limiting the present disclosure thereto. Each of the honeycombs 14 at least partially encloses a capacitor element 3 each on its outer surface 7 in the longitudinal direction 30, on its outer surface 8 in the transverse direction 32 and on its transition surface 9. The integral cooling structure 5 is connected in a materially bonded manner to the lower busbar 2 or the upper busbar 4, in the present example to the lower busbar 2. For example, the capacitor elements 3 are arranged at least approximately abutting ("pressed in") in the honeycombs 14, for example, one capacitor element 3 each is arranged in one honeycomb 14 each, without limiting the present disclosure thereto.

Figures 23, 24, 25, 26:
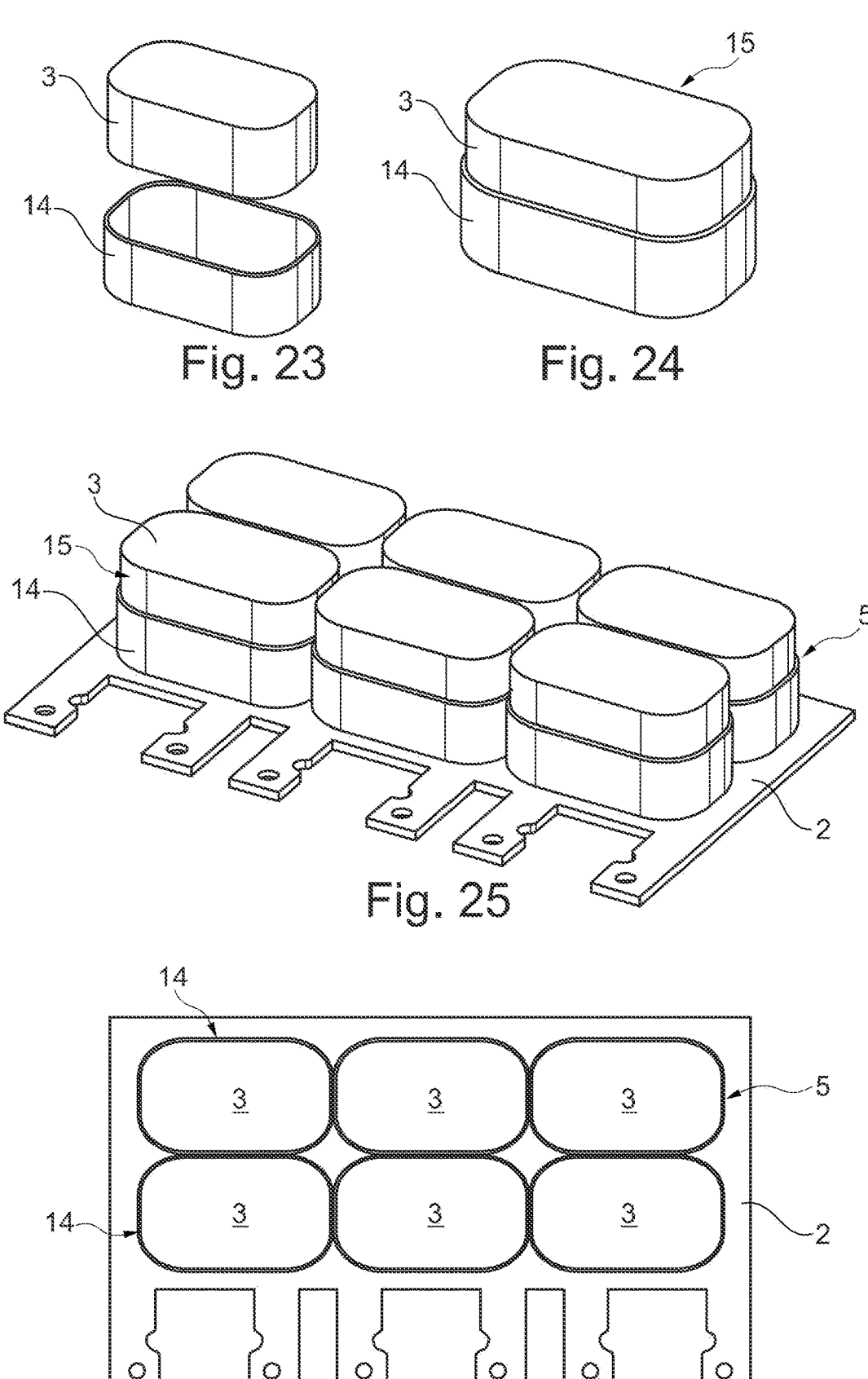
FIGS. 23 to 26 show another possible embodiment of the individual thermally conductive elements of the cooling structure and the assignment of the capacitor elements to the cooling structure.

FIGS. 23 to 26 show another possible embodiment of the individual thermally conductive elements 6 of the cooling structure 5 and the assignment of the capacitor elements 3 to the cooling structure 5. FIGS. 23 and 24 show a perspective view of an individual honeycomb 14 as a thermally conductive element. A single capacitor element 3 can be assigned to each individual honeycomb 14. In FIG. 23, the honeycomb 14 and capacitor element 3 are disassembled, and in FIG. 24, the capacitor element 3 is inserted into the honeycomb 14 and bears against the honeycomb 14 to provide the heat dissipation. The capacitor element 3 inserted in the honeycomb 14 and the honeycomb 14 form a unit 15 consisting of the capacitor element 3 and the honeycomb 14. FIG. 25 shows a perspective view of the spatial arrangement of the units 15 consisting of the capacitor elements 3 and the honeycombs 14 on, for example, the lower busbar 2. The individually arranged honeycombs 14 form the cooling structure 5 (see FIGS. 23 and 24). FIG. 26 shows a top view of the cooling structure 5 and capacitor elements 3 from FIG. 25. The cooling structure 5 consists of a plurality of separate honeycombs 14, in the present example six honeycombs 14, without limiting the present disclosure thereto. In the assembled state of the DC link capacitor 1, a capacitor element 3 is positioned in each honeycomb 14, and a single honeycomb 14 together with the respective capacitor element 3 is connected in a materially bonded manner to the lower busbar 2 or the upper busbar 4 at a respective predefined position, in the present example to the lower busbar 2.

In the embodiments according to FIGS. 20 to 26, the honeycombs 14 are made, for example, without limiting the present disclosure thereto, of copper sheet and are connected to the respective busbar 2 or 4, for example via laser welding technology.

In all embodiments, the finished DC link capacitor 1 is typically potted with a potting compound (not shown). For example, without limiting the present disclosure thereto, the potting can comprise polyurethane (PU) or epoxy resin and, like plastic films of the capacitor elements 3 (film windings), conducts heat poorly. The integrated cooling structure 5 increases the cooling surface inside the DC link capacitor 1 along the capacitor elements 3, in particular along the outer sides 7, 8 and/or transition surfaces 9 in contact with the thermally conductive elements 6, 12, 14, and improves the overall thermal conductivity. The heat is conducted via the cooling structure 5 to the underside of the DC link capacitor 1, which is actively or passively cooled (see active or passive cooling means 10 in FIG. 1). Alternatively or additionally, an upper side of the DC link capacitor 1 can have an active or passive cooling means 10 (not shown).

It is believed that the present disclosure and many of the advantages noted therein will be understandable from the preceding description. It will be apparent that various changes in the shape, number, construction and arrangement of the components can be made without departing from the disclosed subject matter. The form described is illustrative only and it is the intent of the appended claims to comprise and incorporate such changes. Accordingly, the scope of the present disclosure should be limited only by the appended claims.

LIST OF REFERENCE SYMBOLS

1 DC link capacitor
2 Lower busbar
3 Capacitor elements
4 Upper busbar
5 Cooling structure
6 Thermally conductive element
7 Outer surface of the capacitor element in the longitudinal direction
8 Outer surface of the capacitor element in the transverse direction
9 Transition surface of the capacitor element
10 Active or passive cooling means
11 Outer surface of the busbar
12 Cylinder
14 Honeycomb
15 Unit consisting of honeycomb and capacitor element
20 First connection element
22 Second connection element
30 Longitudinal direction
31 Distance in the longitudinal direction
32 Transverse direction
33 Distance in the transverse direction

The invention claimed is:

1. A DC link capacitor, comprising
a lower busbar,
an upper busbar,
a cooling structure including a plurality of thermally conductive elements connected through a weld to one of the lower busbar and the upper busbar, wherein each of the plurality of thermally conductive elements are standalone and indirectly connected through one of the lower busbar and the upper busbar;
a plurality of structurally identical capacitor elements arranged between the lower busbar and the upper busbar and in electrical contact with the lower busbar and the upper busbar, wherein the capacitor elements are each spaced from one another in a longitudinal direction, spaced from one another in a transverse direction, and are in thermally conductive contact with the cooling structure, and
an active or passive cooling means connected to an outer surface of one of the lower busbar and the upper busbar.

2. The DC link capacitor according to claim 1, wherein the plurality of thermally conductive elements are arranged parallel to the longitudinal direction and parallel to the transverse direction and in each case bear against an outer surface of one of the capacitor elements, the outer surface of the capacitor element being one of parallel to the longitudinal direction and parallel to the transverse direction.

3. The DC link capacitor according to claim 1, wherein the plurality of thermally conductive elements are arranged parallel to the longitudinal direction and in each case bear against an outer surface of one of the capacitor elements parallel to the longitudinal direction.

4. The DC link capacitor according to claim 1, wherein the plurality of thermally conductive elements are arranged parallel to the transverse direction and in each case bear against an outer surface of one of the capacitor elements parallel to the transverse direction.

5. The DC link capacitor according to claim 1, wherein the plurality of thermally conductive elements are arranged parallel to the transverse direction and in each case bear against adjacent capacitor elements of the plurality of capacitor elements on respective outer surfaces of the adjacent capacitor elements parallel to the transverse direction.

6. The DC link capacitor according to claim 1, wherein the plurality of thermally conductive elements are arranged parallel to the longitudinal direction and in each case bear against adjacent capacitor elements of the plurality of capacitor elements on respective outer surfaces of the adjacent capacitor elements parallel to the longitudinal direction.

7. The DC link capacitor according to claim 1, wherein the plurality of thermally conductive elements are designed as cylinders, wherein the cylinders are arranged such that the cylinders in each case bear against a respective transition surface of each of the capacitor elements extending from a respective outer surface of each capacitor element parallel to the longitudinal direction to a respective outer surface of each capacitor element parallel to the transverse direction.

8. The DC link capacitor according to claim 1, wherein the cooling structure is designed as integral and comprises a plurality of honeycombs, each of the honeycombs at least partially encloses one capacitor element each on an outer surface in the longitudinal direction, on an outer surface in the transverse direction, and on a transition surface extending from the outer surface in the longitudinal direction to the outer surface in the transverse direction, and the integral cooling structure is connected to one of the lower busbar and the upper busbar.

9. A DC link capacitor comprising:
a lower busbar;
an upper busbar;
a cooling structure including a thermally conductive element connected in a materially bonded manner to one of the lower busbar and the upper busbar, a plurality of structurally identical capacitor elements arranged between the lower busbar and the upper busbar and in electrical contact with the lower busbar and the upper busbar, wherein the capacitor elements are each spaced from one another in a longitudinal direction, spaced from one another in a transverse direction, and are in thermally conductive contact with the cooling structure,
an active or passive cooling means connected to an outer surface of one of the lower busbar and the upper busbar;
wherein the cooling structure comprises a plurality of honeycombs, wherein one of the capacitor elements is positioned in each honeycomb, and each honeycomb together with the corresponding capacitor element is connected to one of the lower busbar and the upper busbar at a predefined position.

10. A DC link capacitor, comprising:
a lower busbar;
an upper busbar;
a plurality of capacitor elements arranged between the lower busbar and the upper busbar and in electrical contact with the lower busbar and the upper busbar, the plurality of capacitor elements being spaced from each other in a longitudinal direction and in a transverse direction; and
a plurality of thermally conductive elements each connected to one of the lower busbar and the upper busbar, each thermally conductive element being in thermally conductive contact with at least one capacitor element;
wherein each of the capacitor elements includes a longitudinal outer surface extending in the longitudinal direction, a transverse outer surface extending in the transverse direction, and a transition surface extending from the longitudinal outer surface to the transverse outer surface; and
the thermally conductive elements are designed as honeycombs, each of the thermally conductive elements being arranged to contact the corresponding longitudinal outer surface, the transverse outer surface, and the transition surface of one of the capacitor elements.

11. The DC link capacitor according to claim 10, wherein the thermally conductive elements are integrally formed with each other.

* * * * *